US005121645A

United States Patent [19]

Agambar et al.

[11] Patent Number: 5,121,645

[45] Date of Patent: Jun. 16, 1992

[54] LATCHABLE ENERGY STORAGE DEVICE FOR OPERATING A MECHANISM

[75] Inventors: Alfred B. Agambar, Waltham Cross; Frank Latham, Redbourn, both of England

[73] Assignee: M.K. Electric Limited, London, England

[21] Appl. No.: 651,451

[22] Filed: Feb. 6, 1991

[30] Foreign Application Priority Data

Aug. 30, 1990 [GB] United Kingdom ................. 9018913

[51] Int. Cl.[5] ............................................ B23Q 11/16

[52] U.S. Cl. ............................................ 74/2; 200/400

[58] Field of Search ............................... 74/2; 200/400

[56] References Cited

U.S. PATENT DOCUMENTS

| | | | |
|---|---|---|---|
| 552,954 | 1/1896 | Chute | 74/2 |
| 876,036 | 1/1908 | Barnes | 74/2 |
| 2,442,464 | 6/1948 | Link | 74/2 X |
| 2,570,153 | 10/1951 | Phillips | 74/2 X |
| 3,337,104 | 8/1967 | Wilson | 74/2 X |
| 3,960,023 | 6/1976 | Gralinski | 74/2 |
| 4,536,726 | 8/1985 | Hideo | 335/23 |
| 4,742,200 | 5/1988 | Marquardt et al. | 74/2 X |

FOREIGN PATENT DOCUMENTS

| | | | |
|---|---|---|---|
| 1550849 | 7/1969 | Fed. Rep. of Germany | 74/2 |
| 382732 | 11/1932 | United Kingdom . | |
| 1080072 | 9/1967 | United Kingdom . | |
| 1319269 | 6/1973 | United Kingdom . | |
| 1320448 | 6/1973 | United Kingdom . | |

*Primary Examiner*—Allan D. Herrmann
*Assistant Examiner*—David W. Laub
*Attorney, Agent, or Firm*—Amster, Rothstein & Ebenstein

[57] ABSTRACT

An energy storage device comprising a resilient member deformable to a stressed energy storing condition in which it is retained by a latch which is displaceable to release the stored energy and displace an actuating member in a first direction. A lost motion connection between the resilient member and setting is displaceable to deform the resilient member to the stressed energy storage condition, the lost motion connection absorbing displacement of the setting when the resilient member is in the stressed energy storage condition, wherein the actuating member is movable in the first direction independently of the resilent member.

17 Claims, 7 Drawing Sheets

LATCHABLE ENERGY STORAGE DEVICE FOR OPERATING A MECHANISM

FIELD OF THE INVENTION

This invention relates to improvements in energy storage devices and is particularly concerned with such devices operable upon command to release the stored energy to operate a mechanism and having means for replacing the energy released.

DESCRIPTION OF RELATED ART

In our co-pending application No. 90 02678.2 filed Feb. 7th, 1990 and U.S. application Ser. No. 650,800 filed Feb. 6th, 1991 we have described an electric switch in which a manually operable dolly is angularly displaceable about a first axis through a top dead centre (TDC) position between two extreme positions towards which it is urged by spring means after passing the TDC position to produce a toggle or snap action effect, the dolly in one extreme position causing or allowing a movable contact to engage another contact and in the other extreme position causing or allowing the movable contact to disengage the other contact. The disclosure of that U.S. application Ser. No. 650,800 is incorporated herein by reference and like references are used to refer to like parts.

In the aforesaid earlier application it is described that, in the event of a moderate overload, an insulated lever 15 is displaced to cause the electrical contacts to separate. Mention is also made of the possibility that the switch could be made to assume an open circuit condition when the sensed value of an external parameter is not at a predetermined value or within a predetermined range of values. An error signal could release stored energy from an energy storage device to rotate a pivot F of the lever 15 which pivot could be square or otherwise keyed to the lever 15.

It is envisaged that the energy storage device of the present invention would be particularly suitable for the purpose mentioned in connection with the electric switch disclosed in our earlier application.

In our co-pending application No. 90 11804.3 filed May 25th 1990 and U.S. application Ser. No. 650,801, filed Feb. 6th, 1991 we have described how the electric switch of the earlier application can be constructed as a module capable of being readily connected to a similar module, the housing of the switches having accessible electrical contacts an opposed faces. The disclosure of said U.S. application Ser. No. 650,801 is incorporated herein by reference and like references are used to denote like parts. Three identical phase switches are described sandwiched between a switch unit 123 for connection to the neutral line and an electronics unit 124 intended to process or respond to the line voltages and current transformer signals in a predetermined manner which can vary from application to application and for which its circuitry would be correspondingly tailored. The switches are engaged one with the other by a square section key 121 which projects from one face of the switch and engages in a complementary keyway of the next adjacent switch. This can be seen from FIG. 2 of the accompanying drawings which corresponds to FIG. 4 of the earlier U.S. application Ser. No. 650,801. The key 121 and keyway 122 are part of the insulated actuating lever 15 of the switch which can actuate the switch from the closed to the open condition when an actuating signal is applied to the solenoid 12 of the switch to displace the armature 13. This rotates the lever 15 about the axis F and such rotation is transmitted by the key 121 and keyway 122 to the other switches so that when one is actuated, all three are actuated.

In such a modular system there are applications where it would be an advantage to be able to actuate all the switches from the closed to the open condition on a command originating other than in a phase line and the energy storage device of the present invention is particularly suitable for this purpose and can readily be incorporated in the electronics unit 124 for this purpose.

U.K. Application No. 9018911.9 filed Aug. 30th , 1990 and U.S. application Ser. No. 651,443 filed Feb. 6th, 1991 we disclosed an actuating device for circuit breakers or switches such as disclosed in our co-pending U.S. applications Ser. Nos. 650,800 and 650,801 previously mentioned whereby the dolly of the or each circuit breaker can be displaced by remote command (or manually) from the ON to the OFF position and from the OFF to the ON position. The disclosure of said U.S. application Ser. No. 651,443 is incorporated herein by reference and like reference numerals are used to denote like parts. The facility to displace the dollies can be used to provide the means for re-charging the energy storage device of the present invention after the stored energy has been released.

SUMMARY OF THE INVENTION

According to the present invention there is provided an energy storage device comprising a resilient member deformable to a stressed energy storing condition in which it is retained by a latch which is displaceable to release the stored energy and displace an actuating member in a first direction and a lost motion connection between the resilient member and setting means displaceable to deform the resilient member to the stressed energy storage condition, the lost motion connection absorbing displacement of the setting means when the resilient member is in the stressed energy storage condition, wherein the actuating member is movable in the first direction independently of the resilient member.

More specifically, the present invention provides an energy storage device comprising a housing in which is pivotally mounted a dolly angularly displaceable about a first axis through a top dead centre position between two extreme positions towards which it is urged by spring means after passing the top dead centre position to produce a toggle or snap action effect, a first cantilever connected to the dolly for angular displacement about a second axis and connected to first and second links associated respectively with energy storage means and a latch mechanism operable to release the stored energy, the energy storage means comprising a resilient member deformable to a stressed energy storing condition in which it is retained by the latch mechanism, a first lost motion connection between the first link and the energy storage means and a second lost motion connection between the second link and the latch mechanism, the first and second lost motion connections absorbing angular displacement of the dolly between the two extreme positions when the resilient member is in the stressed energy storage condition.

BRIEF DESCRIPTION OF THE DRAWING

One embodiment of the invention will now be described by way of example, reference being made to the accompanying drawings in which.

DETAILED DESCRIPTION OF THE PREFERRED EMBODIMENTS

Figure 1:
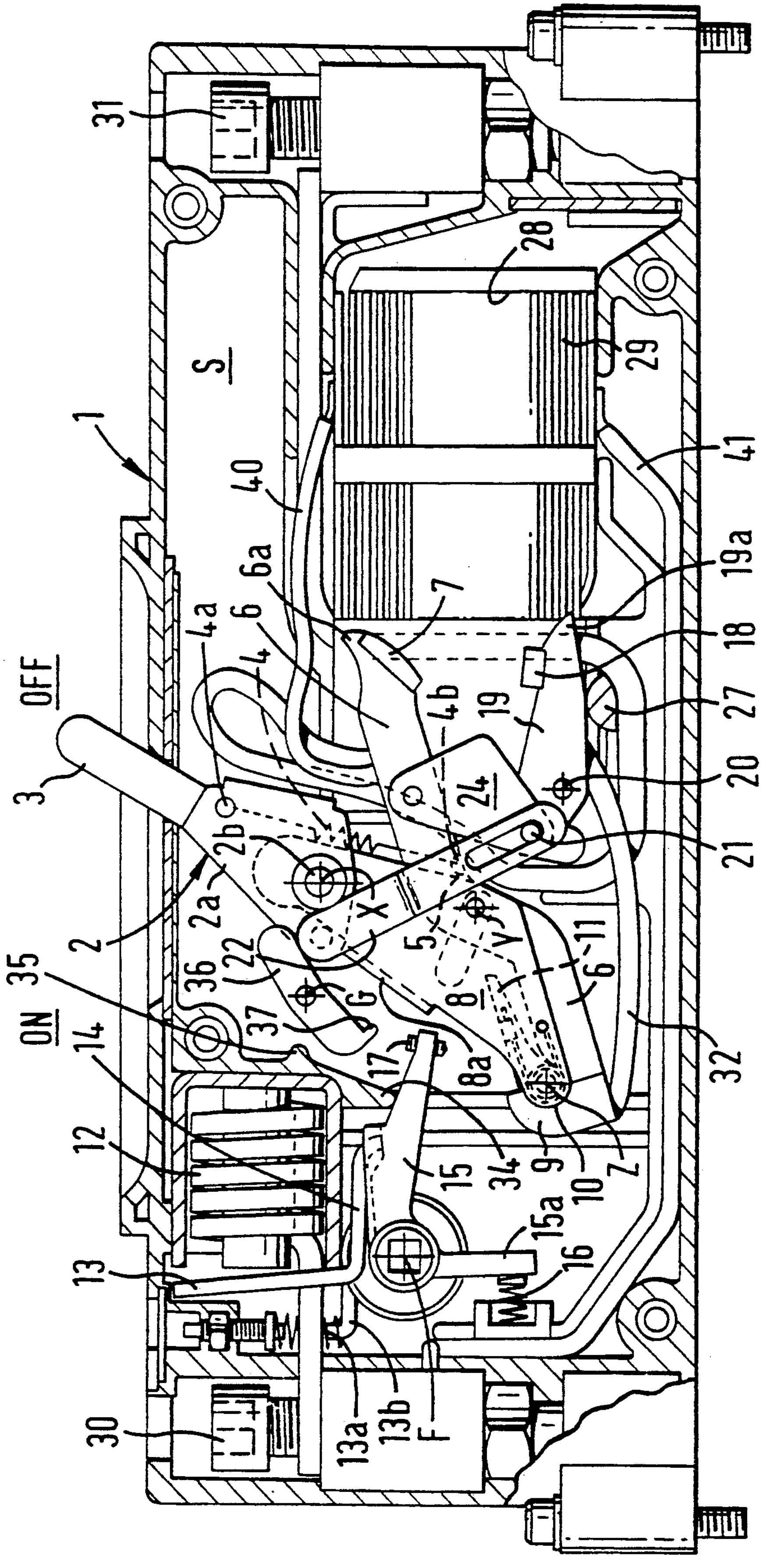
FIG. 1 is a view of circuit or switch such as disclosed in our co-pending U.K. application No. 90 02678.2 and U.S. application Ser. No. 650,801.
Figure 2:
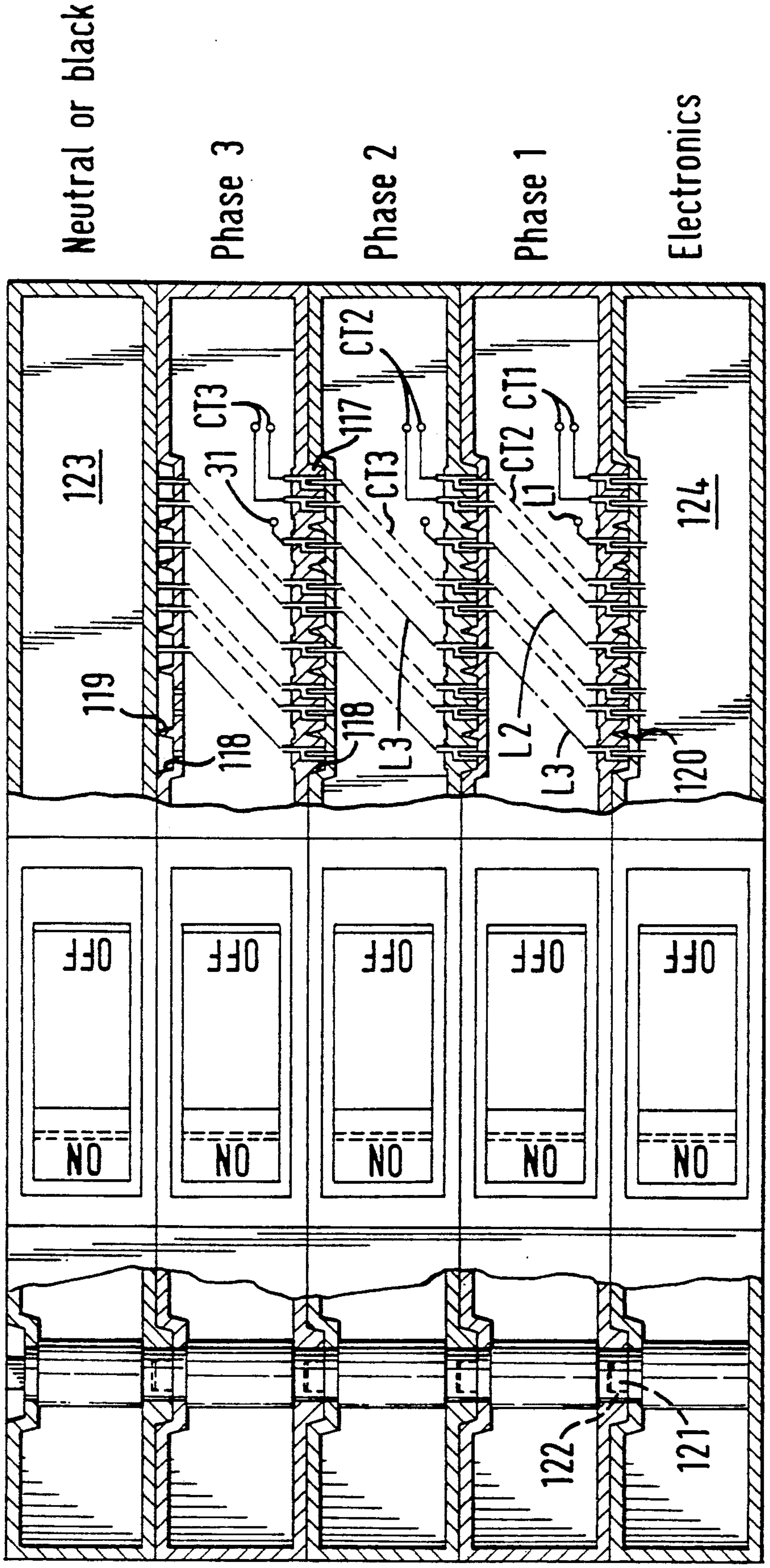
FIG. 2 is a view corresponding to FIG. 4 of our co-pending U.K. application No. 90 11804.3 and U.S. application Ser. No. 650,801 and illustrating three switches or circuit breakers sandwiched between a neutral unit and an electronics unit and providing a control unit composed of mechanically and electrically connected modules.

The control unit shown in FIG. 2 controls three phases of a three phase supply and is in modular form with the modules electrically and mechanically connected. In the event of a moderate overload in any one of the phase circuits, the armature 13 of the solenoid of the associated phase circuit breaker will be attracted to the solenoid 12 angularly to displace the insulated lever 15 clockwise against resistance of resilient means. This causes nib 17 to bear against the trip lever 11 and disengage the arm 6 from the tail member 8 to allow the contacts 7 and 18 to separate under the influence of the pull-off spring 4. Rotation of the lever 15 about the axis F is transmitted by the key 121 and keyway 122 to the other switches so that when one is actuated they are all three actuated.

The electronics unit 124 has available to it the line voltages L1, L2 and L3 and the current transformer signals CT1, CT2, CT3 and is also provided with a key 121 which is engaged with the keyway of the next adjacent phase switch 1 and through which it can switch all the switches off.

The electronics unit 124 also has a dolly 3 as does the neutral unit and, in order to enable the units to be switched together, the dollies 3 are strapped together and are operated by an actuating device such as is described in our co-pending U.K. Application No. 9018911 and U.S. application Ser. No. 651,443. In that disclosure, the actuating device is a motor operable to drive a pair of contra rotating arms 209 and 210 through 180° to engage and displace the strap 218 connecting the dollies. As described, the actuating device can be used to displace the dollies 3 from the ON to the OFF position and from the OFF position to the ON position.

FIGS. 3 to 6 illustrate an energy storage device according to the present invention housed in the electronics unit 124. The dolly 3 of this unit is angularly displaceable about a fixed axis 300 through a top dead centre (TDC) position between two extreme positions towards which it is urged by spring means 301 after passing through the TDC position to produce a toggle or snap action effect. The spring means 301 is anchored at one end on the dolly 3 at 302 and at the other end on a fixed centre 303 in the housing. An L-shaped cantilever 304 is mounted for angular displacement about a fixed axis 305 and has one end attached at 306 to the dolly 3 by a pin 307 in slot 308 (FIG. 5) and the other end connected at centre 309 to link 310 and at centre 311 to link 312. At the other end of each link 310 and 312 is an elongate slot 313 and 314 respectively which slots provide a lost motion connection.

Figure 5:
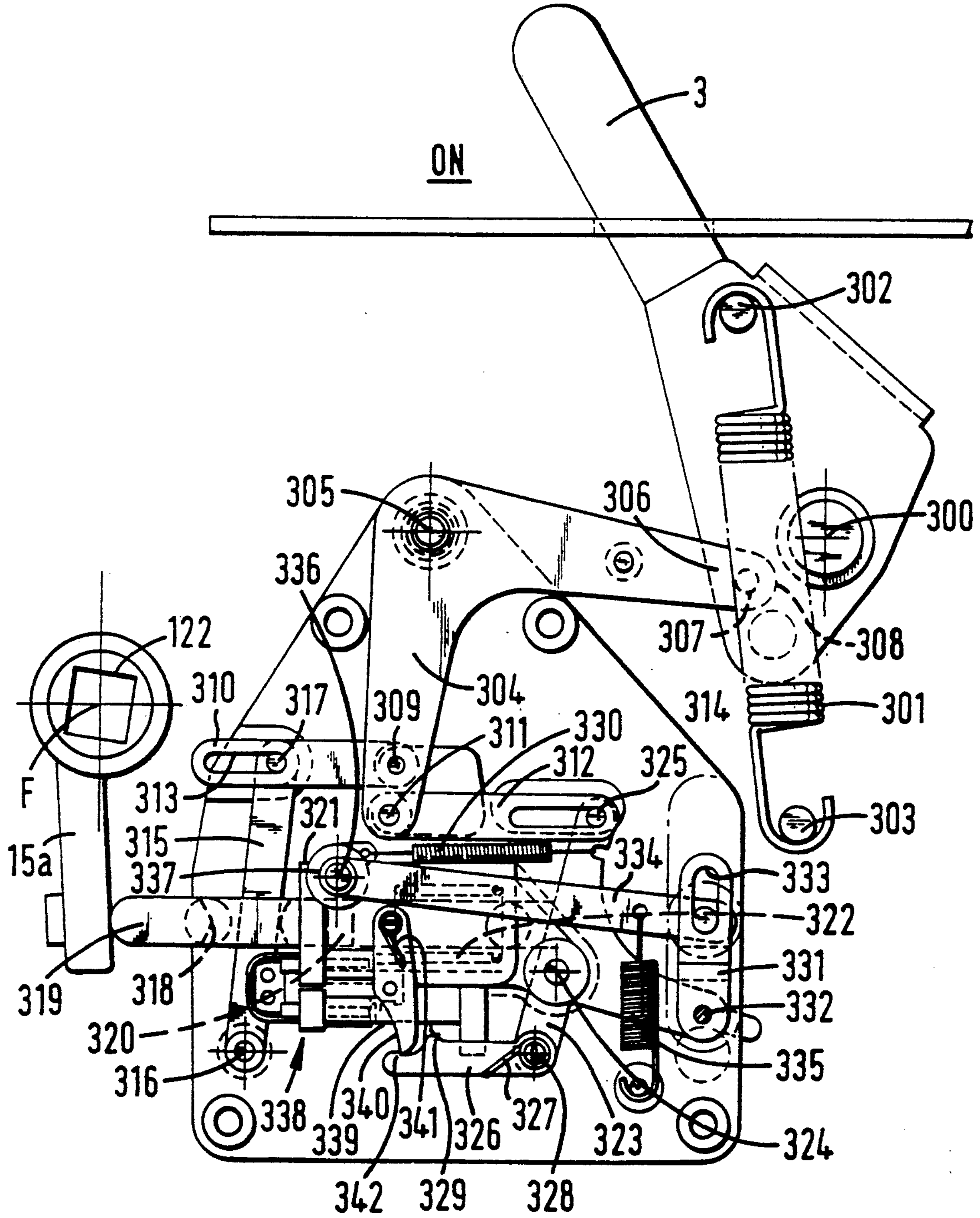
FIG. 5 is an enlarged view of the device shown in FIG. 3.
Figure 6:
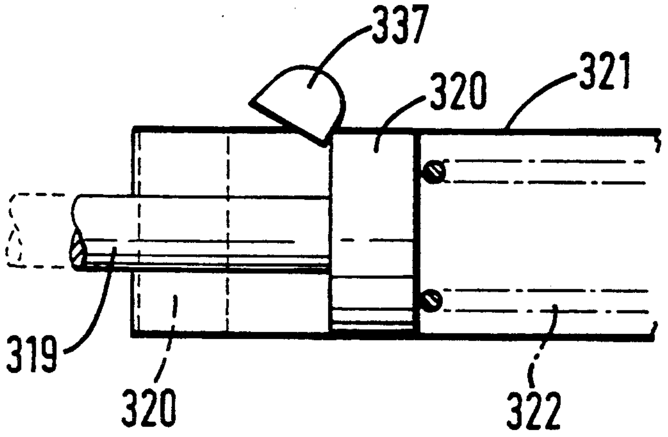
FIG. 6 is a fragmentary view of a detail.

A lever 315 is mounted for rotation about a fixed axis 316 and is connected to the link 310 by a pin 317 which is free to move within the lost motion slot 313. As best seen in FIGS. 5 and 6, the lever 315 passes through a slot 318 formed in an extension 319 of a piston 320 displaceable in a cylinder 321 and urged towards one end thereof by a compression spring 322.

A T-shaped cantilever 323 is mounted for rotation about a fixed axis 324 and one end of the cross-piece is connected to the link 312 by pin 325 which is free to move in the lost motion slot 314. The other end of the cross-piece is connected to a latch 326 which is loaded by a spring 327 for clockwise rotation about a fixed axis 328 to engage a cam face 329. The cantilever 323 is biased for rotation about the axis 324 in the anti-clockwise direction by a spring 330.

The tail of the cantilever 323 is connected to a further link 331 at a pivotal centre 332 towards one end of the link 331, the other end of the link 331 having an elongate slot 333 in which is engaged a trip lever 334. The trip lever is loaded by spring 335 for clockwise rotation about a fixed axis 336 and carries a "D" bar trip cam 337 which can be regarded as a cylindrical rod coaxial with the axis 336 and having a part cut away along a diameter to provide a flat face. The cam 337 is intended to hold the piston 320 against displacement by the spring 322 and so prevent release of energy stored in the spring 322.

A magnetic latch indicated generally at 338 is provided and this retains an armature 339 which is mounted on a carrier 340. A magnetic latch, as is known, retains the armature 339 in a magnetically attracted position and releases the armature when a pulse of current is supplied to the coil associated with the magnetic circuit and weakens the magnetic field. The carrier 340 is spring loaded by spring 341 for rotation in the clockwise direction and is engaged by its end with a nib 342 formed at the free end of the latch 326.

The free end of the piston extension 319 bears against a trip lever 15*a* which is displaceable about fixed axis F to rotate the key 121.

Figure 3:
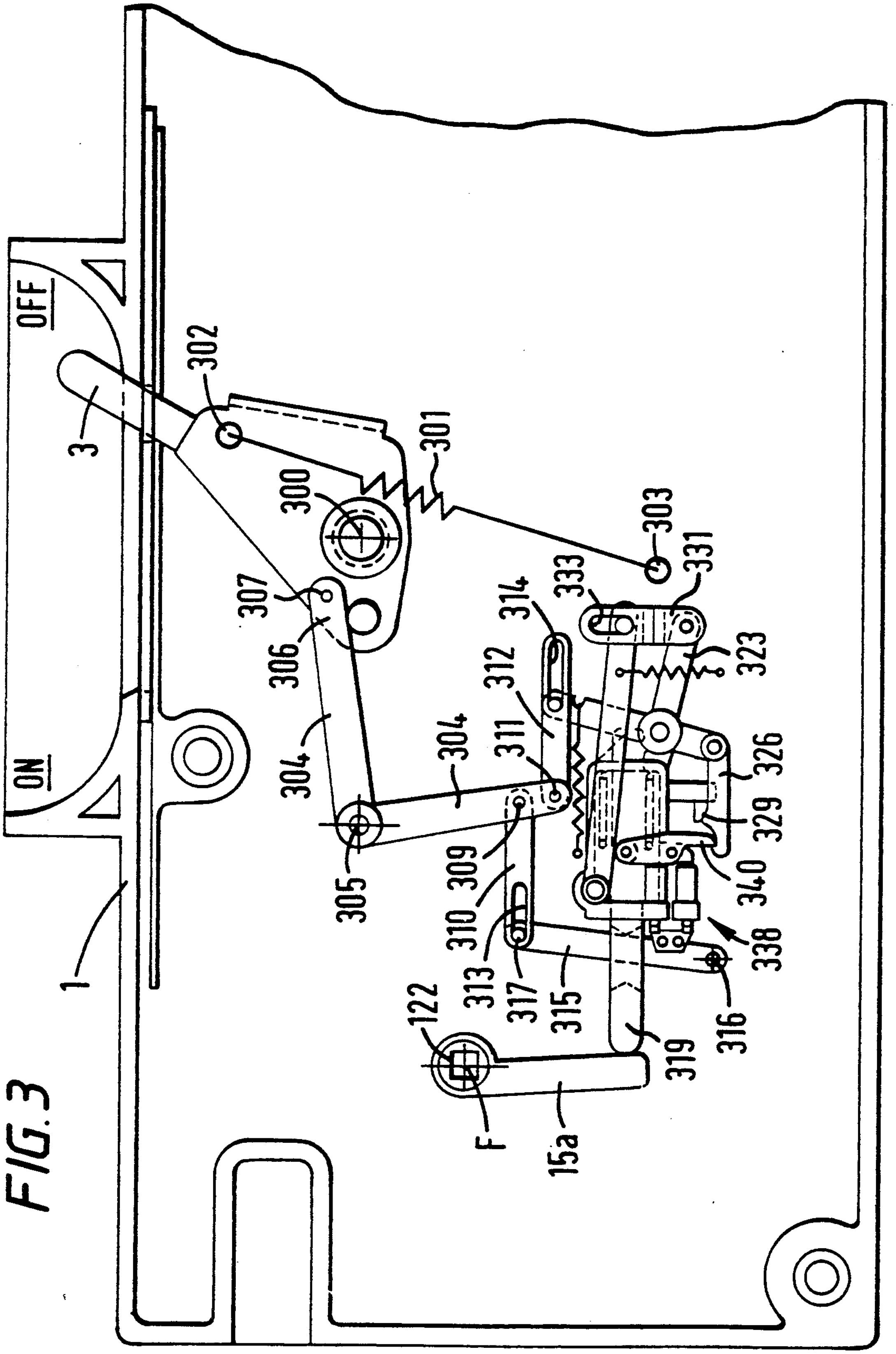
FIG. 3 is a view of an energy storage device according to the present invention incorporated in the electronics unit of FIG. 2, part of the housing being omitted.

As shown in FIG. 3, the energy storage device is charged, i.e. the spring 322 is compressed, and the dolly 3 is in what may be considered the OFF position corresponding to the OFF position of the dollies of the phase circuit breakers to which it is strapped in this example.

In this position, the contacts of the phase circuit breakers are open and disengaged and there is no need or use for an external instruction or command to achieve this already existing state.

Figure 4:
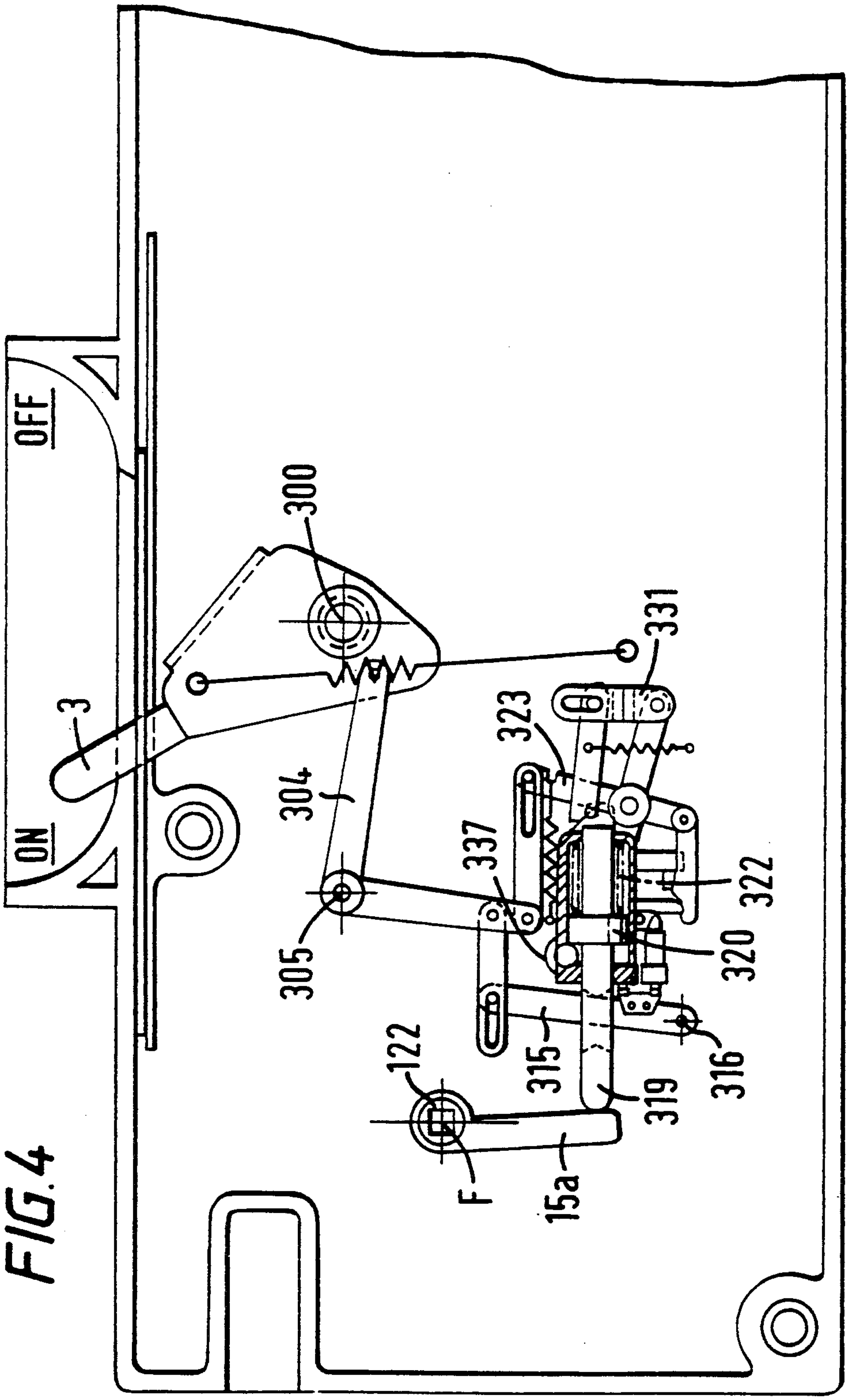
FIG. 4 is a view similar to FIG. 3 showing the device with the dolly moved from the OFF position of FIG. 3 to the ON position.

Movement of the dolly 3 from the OFF position shown in FIG. 3 to the ON position shown in FIG. 4 causes the cantilever 304 to pivot about the fixed axis 305 which results in the pins 317 and 325 sliding in the lost motion slots 313 and 314 respectively. No other part of the mechanism changes its position. If now the dolly is returned to the OFF position, the procedure is reversed but the energy storage device remains passive.

If, however, a command signal is received by the magnetic latch 338 when the dolly 3 is in the ON position, the stored energy is released, the piston extension 319 is displaced and rotates the trip lever 15*a* and key 121 in the clockwise direction about the axis F and this trips all the phase units to the open circuit condition. The detail of this operation is as follows:

A command signal to the magnetic latch 338 weakens the magnetic field retaining the armature 339. This allows the spring 330 to overcome the effect of the carrier return spring 341 so that the cantilever 323 pivots about the axis 324 drawing with it the latch 326. The latch 326, by the nib 342 pulls the armature carrier 340 until the cam face 329 forces the latch 326 to pivot about axis 328 and release the carrier 340 which, together with the armature returns to the original position to reclose the pole faces of the magnetic latch in a minimum of time.

Figure 7:
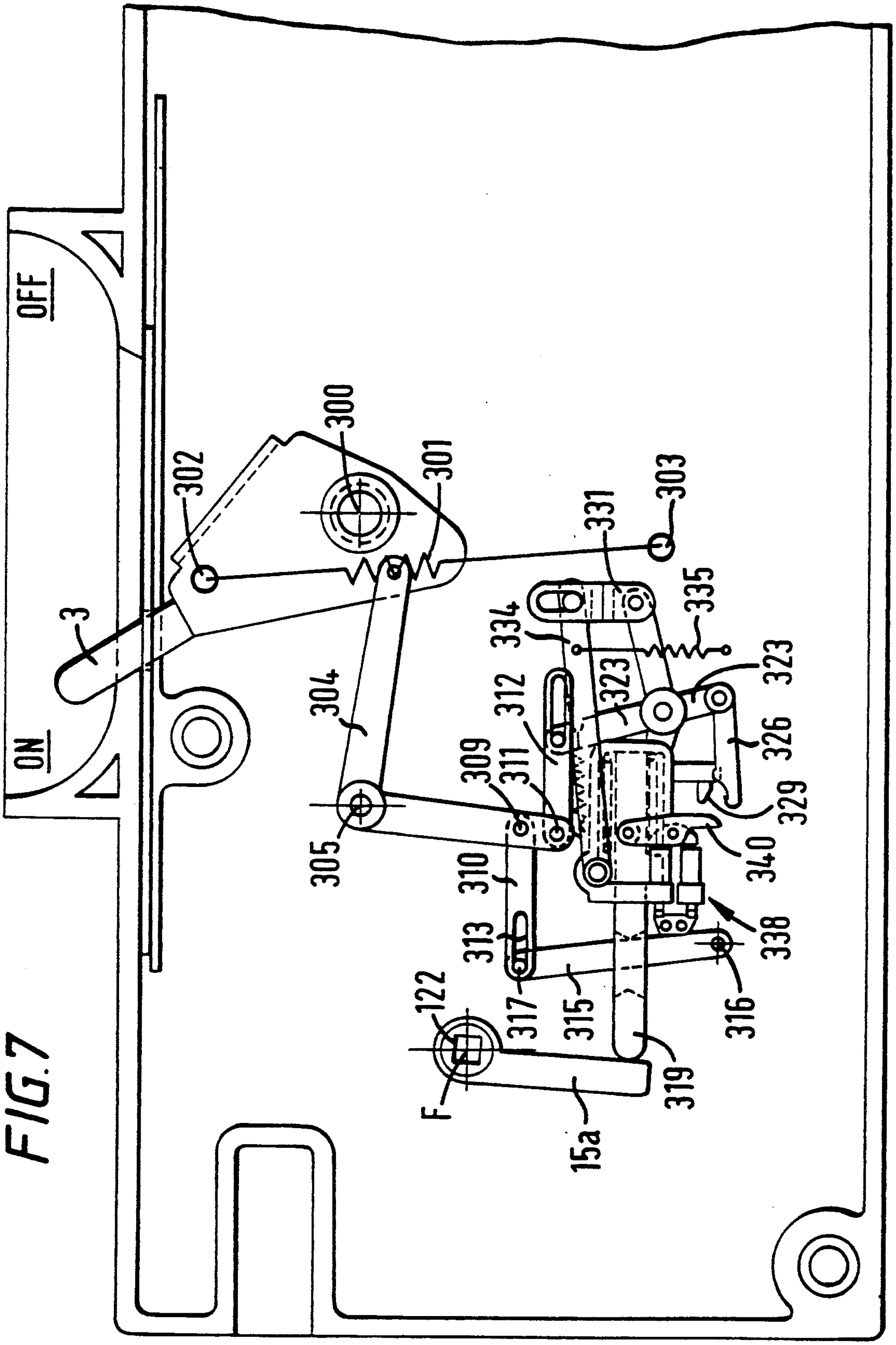
FIG. 7 is a view of the device shown in FIG. 3 after the stored energy has been released.

The cantilever 323 takes up the position shown in FIG. 7 in which the pin 325 has moved to the other end of the slot 314, the tail of the cantilever 323 has displaced the link 331 to pivot the trip lever 334 against spring 335 about the axis 336 and rotate the trip cam 337 so that it no longer impedes displacement of the piston 320 which is now axially displaced by expansion of the compressed compression spring 322. This axially displaces the piston extension 319 which bears against the trip lever 15*a* and displaces it about the axis F and also carries with it the link 315 which pivots about the axis 316 and moves the pin 317 to the other end of the lost motion slot.

Once the mechanism has been triggered and the stored energy released, it can be recharged by moving the dolly 3 from the ON position shown in FIG. 7 to the OFF position. This rotates the cantilever 304 in the anti-clockwise direction about the axis 305 causing the links 310 and 312 to be displaced to the right as seen in FIG. 7. Because of the position of the pins 317 and 325 which are at the left-hand ends of their respective slots 313 and 314, this rotates the lever 315 in the clockwise direction about the axis 316 and the cantilever 323 in the clockwise direction about the axis 324. Rotation of the lever 315 displaces the piston extension 319 and the piston 320 to compress the spring 322 and recharge the device. As the piston 320 is displaced past the flat face of the cam 337 and beyond the cam 337, the latter is now free to rotate about the axis 336 to the latched position in which the piston 320 is prevented from being displaced by the spring 322. The cam 337 is rotated by the lever 334 which pivots in the clockwise direction about the axis 336 under the influence of spring 335.

As the lever 334 cannot pivot until the piston 320 has cleared the cam 337, the initial rotation of the cantilever 323 is accommodated by the lost motion provided by the slot 333 in the link 331. When the piston 320 clears the cam 337 and the lever 334 is reset, the pin connection of the lever 334 in the slot 333 returns to its original position.

The clockwise rotation of the cantilever 323 has two further effects. Firstly, it stretches the spring 330 and re-sets it ready for the next pull-off operation and, secondly, it pushes the latch 326 back into the latched position so that the energy storage device is ready for the next operation. The trip lever 15*a* would be reset through the key 121 by the re-setting of the corresponding trip levers in the phase circuit breakers although, in other circumstances and applications, a simple spring could be provided to urge it into contact with the piston extension 319.

It will be noted that displacement of the dolly 3 between the ON and OFF positions has no effect on the energy storage device when it is charged with energy owing to the lost motion connection provided by the slots 313 and 314. When the dolly is in the ON position and the stored energy has been released, the dolly remains in the ON position as, in fact do the dollies of the phase circuit breakers with which it is associated. Returning the dolly to the OFF position either manually or by an actuating device such as referred to above, recharges the device with stored energy in readiness for the next operation.

The energy storage device described has applications other than that described in the example. It will be appreciated, however, that it is particularly useful in a modular system such as that shown in FIG. 2 and described in our co-pending U.K. application No. 90 11804.3 and U.S. application Ser. No. 650,801 together with an actuating device for such a system as described in our co-pending U.K. Application No. 9018911.9 and U.S. application Ser. No. 651,443 in which the dollies of the modules are strapped together and can be actuated manually or by remote command as this enables the units to be triggered by a pulse signal to the magnetic latch 338 and the energy storage device to be recharged by the return of the dolly to the OFF position.

It will be noted that the pivotal axes in the device described are parallel to one and other.

We claim:

1. An energy storage device comprising a resilient member deformable to a stressed condition in which it contains stored energy, in which condition it is retained by a latch which is displaceable to release the stored energy and displace an actuating member in a first direction, setting means displaceable to deform the resilient member to the stressed condition and a lost motion connection between the resilient member and the setting means, the lost motion connection absorbing displacement of the setting means when the resilient member is in the stressed condition, wherein the actuating member is movable in the first direction independently of the resilient member.

2. A device according to claim 1 in which the resilient member comprises a compression spring arranged to be compressed to the stressed energy storing condition by a piston displaceable by a first pivotal link connected through a pin and slot connection to a further link connected to the setting means.

3. A device according to claim 2 in which the pivotal link passes through an extension of the piston whereby displacement of the piston upon release of the stored energy displaces the extension of the piston and displaces the first pivotal link in one direction, displacement of the first pivotal link being absorbed by the pin and slot connection and displacement of the first pivotal link in the other direction by the setting means displaces the piston and compresses the compression spring.

4. A device according to claim 1 in which the resilient member comprises a compression spring arranged to be compressed to the stressed condition by a piston and the latch is an angularly displaceable member configured to engage the piston in one position to retain the spring in compression and to move out of engagement with said piston when angularly displaced to a second position to release the stored energy.

5. A device according to claim 4 in which the latch is angularly displaceable by a trip lever, a second pivotal link arranged to bias said trip lever and thereby to urge the latch towards the second position, said second pivotal link being connected through a pin and slot connection to an additional link connected to the setting means.

6. A device according to claim 5 in which the trip lever is connected to the second pivotal link by a further connection incorporating lost motion allowing the latch to remain in the second position until the piston is displaced sufficiently to clear the latch and compress the spring.

7. A device according to claim 5 in which the second pivotal link is connected to the additional link by a cantilever rotatable about a fixed axis.

8. A device according to claim 7 in which the cantilever is of T-shape with one end of the cross-piece connected through the pin and slot connection to the additional link, the other end of the cross-piece is engaged with a detent mechanism and the tail of the T-shape connected to the second pivotal link.

9. A device according to claim 8 in which the cantilever is resiliently biased for rotation about the fixed axis in a first sense so as to provide said bias by said second pivotal link, such rotation of the cantilever being opposed by the detent mechanism, wherein release of the detent mechanism permits the latch to move under said bias to the second position, and rotation of the cantilever in the sense opposite to the first sense returns the detent mechanism to the engaged position.

10. A device according to claim 1 in which the latch mechanism forms part of a magnetic latch responsive to a command signal to release the engagement between the latch mechanism and the tail of the cantilever.

11. A device according to claim 1 including latch actuating means and latch resetting means and a further lost motion connection between the setting means and the latch resetting means absorbing displacement of the setting means when the resilient member is in the stored energy condition.

12. A device according to claim 11 in which the setting means comprises a first cantilever connected through a first link and a first pin and slot connection to a pivotal link operable to deform the resilient member and the latch resetting means comprises a second cantilever connected through a second link and a second pin and slot connection to the first cantilever and operable to reset the latch upon displacement of the setting means to deform the resilient member.

13. A plurality of devices according to claim 1, the actuating members of each device being interconnected so that release of energy from one resilient member in one device actuates the actuating member of said interconnected device without release of the resilient member of the interconnected device.

14. An energy storage device according to claim 13 in which a housing of one said device has a key engageable with a keyway of a housing of a further device, and the release of the stored energy is arranged to displace the key or keyway and correspondingly displace the complementary keyway or key.

15. An energy storage device comprising a housing, a dolly, pivotally mounted in said housing and angularly displaceable about a first axis through a top dead centre position between two extreme positions, spring means arranged to urge said dolly towards said extreme positions after passing the top dead centre position to produce a toggle or snap action effect, energy storage means comprising a resilient member deformable from a first condition to a stressed condition so as to store energy, a latch movable between a first position and a second position in which it respectively prevents and allows the return of the resilient member from the stressed condition to the first condition, the dolly being operatively connected to the energy storage means by way of a first lost motion connection, and the dolly being operatively connected to the latch by way of a second lost motion connection, so that when the resilient member is in the first condition, movement of the dolly between a selected one and the other of the two extreme positions causes the resilient member to deform to the stressed condition and the latch to move to the first position, the first and second lost motion connections absorbing angular displacement of the dolly between the two extreme positions when resilient member is in the stressed condition.

16. A device according to claim 15 in which the energy storage means comprises a compression spring, a pivotal link, a displaceable piston connected through the pivotal link and the first lost motion connection to the first link, the piston being arranged to be compressed to the energy storing condition.

17. A device according to claim 15 in which the latch mechanism comprises a cam member angularly displaceable between a first position in which it prevents displacement of the piston so as to maintain the deformable member in the stressed condition, and a second position in which it permits displacement of the piston, a magnetic latch mechanism responsive to an electric signal to cause or allow the cam member to be displaced to the second position and a latch resetting member operable by displacement of the dolly from the selected one extreme position to the other to cause or allow the cam member to be displaced to the one position.

* * * * *